United States Patent
Matsuura et al.

(10) Patent No.: US 8,070,217 B2
(45) Date of Patent: Dec. 6, 2011

(54) VEHICLE BODY REAR PART STRUCTURE

(75) Inventors: Norikazu Matsuura, Wako (JP);
Takayuki Takahashi, Wako (JP);
Atsushi Hasegawa, Wako (JP); Yusuke Miura, Tokyo (JP); Kazutaka Kanezashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 12/788,774

(22) Filed: May 27, 2010

(65) Prior Publication Data

US 2010/0301637 A1    Dec. 2, 2010

(30) Foreign Application Priority Data

May 28, 2009 (JP) .................................. 2009-129579
Feb. 16, 2010 (JP) .................................. 2010-031544

(51) Int. Cl.
*B62D 21/00* (2006.01)
(52) U.S. Cl. .................................. 296/203.04; 280/784
(58) Field of Classification Search ............. 296/187.01, 296/187.03, 187.08, 203.01, 203.04, 204; 280/781, 784
See application file for complete search history.

(56) References Cited

U.S. PATENT DOCUMENTS

| | | | | |
|---|---|---|---|---|
| 4,163,578 A * | 8/1979 | Watson | ......................... | 296/204 |
| 4,840,424 A * | 6/1989 | Asoh | ........................... | 296/204 |
| 5,074,587 A * | 12/1991 | Schwede et al. | ............... | 280/781 |
| 5,806,918 A * | 9/1998 | Kanazawa | ...................... | 296/204 |
| 6,120,060 A * | 9/2000 | Kocer et al. | ..................... | 280/788 |
| 6,206,460 B1 * | 3/2001 | Seeliger et al. | ............... | 296/204 |
| 6,206,461 B1 * | 3/2001 | Gaiser | ........................... | 296/204 |
| 6,227,610 B1 * | 5/2001 | Iwatsuki et al. | ............... | 296/204 |
| 6,679,546 B2 * | 1/2004 | Mishima et al. | ......... | 296/203.01 |
| 7,192,081 B2 * | 3/2007 | Tijerina et al. | ................ | 296/205 |
| 7,635,158 B2 * | 12/2009 | Park | .......................... | 296/203.04 |
| 7,828,370 B2 * | 11/2010 | Ohi et al. | ................. | 296/187.08 |
| 2006/0061142 A1 * | 3/2006 | Kobayashi et al. | ...... | 296/203.04 |
| 2006/0113784 A1 * | 6/2006 | Kishima | ....................... | 280/784 |
| 2008/0252104 A1 * | 10/2008 | Yamaguchi et al. | ...... | 296/203.04 |
| 2009/0001767 A1 | 1/2009 | Yamaguchi et al. | | |
| 2010/0078967 A1 * | 4/2010 | Boettcher | ................ | 296/193.07 |
| 2010/0237659 A1 * | 9/2010 | Ishigame et al. | ............. | 296/204 |
| 2011/0133520 A1 * | 6/2011 | Kondou et al. | ............... | 296/204 |

FOREIGN PATENT DOCUMENTS

JP     39-16058     6/1964

(Continued)

*Primary Examiner* — Lori Lyjak
(74) *Attorney, Agent, or Firm* — Rankin, Hill & Clark LLP

(57) ABSTRACT

A vehicle body rear part structure improved against rear-side collisions is disclosed. The rear part of a vehicle body includes left and right rear side frames; a front cross member and a rear cross member, both extending between the left and right rear side frames; and a bar and a bracket. The rear cross member has arm support parts for supporting lower arms of left and right rear suspensions on a center part which is lower than lateral ends of the vehicle body. The bar is curved in a convex manner toward the bottom of the vehicle body, and the bar connects center parts of the front and rear cross members together. The bracket mounts a rear end of the bar to the rear cross member while enclosing the rear end from the bottom of the vehicle body.

10 Claims, 9 Drawing Sheets

FOREIGN PATENT DOCUMENTS

| | | |
|---|---|---|
| JP | 59-133374 | 9/1984 |
| JP | 60-227971 | 11/1985 |
| JP | 62-131809 | 6/1987 |
| JP | 64-022623 | 1/1989 |
| JP | 03-53321 | 5/1991 |
| JP | 04-011517 | 1/1992 |
| JP | 05-22139 | 3/1993 |
| JP | 2006-096185 | 4/2006 |
| JP | 2006-159253 | 6/2006 |
| JP | 2008-056189 | 3/2008 |
| JP | 2008-174121 | 7/2008 |
| JP | 2008-207676 | 9/2008 |

* cited by examiner

US 8,070,217 B2

VEHICLE BODY REAR PART STRUCTURE

FIELD OF THE INVENTION

The present invention relates to a vehicle body rear part structure improved against collisions at the rear end of a vehicle, or so-called rear-side collisions.

BACKGROUND OF THE INVENTION

Such vehicle body rear part structures, designed with consideration given to rear-side collisions, are known in the art, e.g., as disclosed in Japanese Patent Application Laid-Open Publication No. 2006-96185 (JP-A 2006-096185) and Japanese Patent Application Laid-Open Publication No. 2008-56189 (JP-A 2008-056189).

FIG. 11 hereof shows the rear part of a vehicle body disclosed in JP-A 2006-096185.

The rear half of the vehicle body 100 shown in FIG. 11 comprises a front floor panel 101, left and right floor frames 102, a rear floor panel 103, left and right rear side frames 104, and a cross member 105. The left and right floor frames 102 extend in a longitudinal direction of the vehicle body underneath the front floor panel 101. The left and right rear side frames 104 extend in the longitudinal direction of the vehicle body underneath the rear floor panel 103. The cross member 105 extends between the left and right rear side frames 104. A fuel tank 106 is disposed underneath the rear floor panel 103 and in front of the cross member 105.

The bottom surface of the fuel tank 106 is held on the vehicle body 100 by left and right holding bands 107. The left and right holding bands 107 span between the left and right floor frames 102 and the cross member 105. These left and right holding bands 107 are thin plate-shaped members for holding the fuel tank 106, and the bands do not apply a large amount of resistance (opposing force against a collision load) against a collision load when a rear-side collision occurs.

FIG. 12 hereof shows the rear part of the vehicle body disclosed in JP-A 2008-056189.

The rear part of the vehicle body 110 comprises left and right side sills 111, 111, a front cross member 112, left and right rear side frames 113, 113, a rear cross member 114, and left and right stays 116, 116, as shown in FIG. 12. The front cross member 112 spans between the rear ends of the left and right side sills 111, 111. The left and right rear side frames 113, 113 extend rearward from the rear ends of the left and right side sills 111, 111. The rear cross member 114 spans between the left and right rear side frames 113, 113, and rear suspensions are mounted thereon. The left and right stays (tank frames) 116, 116 extend at an incline from the vehicle-widthwise center of the rear cross member 114 to the rear ends of the side sills 111, 111. A fuel tank 117 is positioned in the space enclosed by the front cross member 112, the left and right rear side frames 113, 113, and the rear cross member 114.

The left and right stays 116, 116 pass underneath the fuel tank 117, and the stays have the function of transmitting loads from the vehicle-widthwise center of the rear cross member 114 to the left and right side sills 111, 111. The left and right stays 116, 116 constitute effective means for dealing with rear-side collisions, but since a pair of left and right stays are needed, a large number of components are involved, leading to a proportionate increase in the vehicle body weight.

SUMMARY OF THE INVENTION

It is therefore an object of the present invention to provide a technique whereby the rear part of a vehicle body can be reinforced against rear-side collisions by a simple configuration having a small number of components.

According to an aspect of the present invention, there is provided a vehicle body rear part structure comprising: left and right rear side frames disposed at a rear part of a vehicle body such that they are spaced apart from each other laterally of a vehicle body and extend longitudinally of the vehicle body; a front cross member extending between front ends of the left and right rear side frames; and a rear cross member positioned behind the front cross member and extending between the left and right rear side frames, the rear cross member having vehicle-body-widthwise ends and a center part positioned between and lower than the widthwise-direction ends, the widthwise center part of the rear cross member having arm support parts for supporting lower arms of left and right rear suspensions, wherein the vehicle body rear part structure further comprises: a bar; and a bracket, the bar is provided for connecting a widthwise center part of the front cross member and the widthwise center part of the rear cross member and is curved in a convex manner toward a bottom of the vehicle body, and the bracket is provided for mounting a rear end of the bar, positioned on a bottom surface of the widthwise center part of the rear cross member, onto the bottom surface of the widthwise center part while enclosing the bar rear end from the bottom of the vehicle body.

In this manner, the bottom surface of the vehicle-widthwise center part of the rear cross member is connected by the bar to the vehicle-widthwise center part of the front cross member. In the case of a so-called rear-side collision, in which a vehicle or another colliding object collides with the rear cross member from behind the vehicle body, the collision load (collision energy) acting on the rear cross member from the colliding object is transmitted to the vehicle-widthwise center part of the front cross member via the bar. The bending deformation of the rear cross member can be reduced as much as possible by the resistance acting in the longitudinal direction of the bar (opposing force against the collision load) during the rear-side collision. The bar thus fulfills the role of a stay. The vehicle-widthwise center part of the rear cross member is also supported by the bar, whereby the strain on the rear cross member and the left and right rear side frames can be reduced. As a result, the strength and rigidity of the rear cross member and the left and right rear side frames can be reduced, and the weight of the vehicle body can therefore be reduced. Moreover, the rear part of the vehicle body can be reinforced by an extremely simple configuration having a small number of components, wherein merely the vehicle-widthwise center part of the front cross member and the vehicle-widthwise center part of the rear cross member are connected by the bar.

Furthermore, in the present invention, the rear end of the bar is enclosed from the bottom of the vehicle body by the bracket, and is mounted to the bottom surface of the rear cross member. Therefore, the rear end of the bar can be firmly mounted to the rear cross member by the bracket. Moreover, the bottom surface of the rear end of the bar is pushed from below by the bracket enclosing the rear end from the bottom of the vehicle body. Therefore, the deformation of the bar toward the bottom of the vehicle body as caused by the collision load can be reduced. Therefore, a large amount of resistance (opposing force) is created in the bar against the collision load acting as though to bendably deform the bar downward.

Furthermore, in the present invention, the rear cross member is designed so that the vehicle-widthwise center part is lower than the vehicle-widthwise ends, in order to support the lower arms of the left and right rear suspensions. Therefore, when a collision load acts on the vehicle-widthwise center part of the rear cross member, a bending moment acting in a direction of collapsing backward is applied to the rear cross member such that the reference points are the proximal ends of the vehicle-widthwise ends joined to the left and right rear side frames. To deal with this occurrence, the rear end of the bar, which bends so as to be convex towards the bottom of the vehicle body, is mounted to the vehicle-widthwise center part of the rear cross member by the bracket for enclosing the rear end from the bottom of the vehicle body. The collision load transferred to the rear end of the bar from the rear cross member acts as though to bendably deform the bar toward the bottom of the vehicle body. At this time, resistance is created in the bar against the collision load acting as though to deform the bar downward. As a result, a so-called opposite moment is applied to the bar, the moment being a moment acting in a direction of cancelling out the bending moment. Therefore, the collapse of the rear cross member can be reduced.

Preferably, the bar passes below a fuel tank disposed between the front cross member and the rear cross member. Thus, the bar is bent downward by the collision load transmitted from the rear cross member to the rear end of the bar. Therefore, no concern is presented that the deformed bar will come in contact with the fuel tank.

Desirably, the bracket is formed into a generally U shape having flanges at upper ends thereof, the flanges being superposed and mounted onto the bottom surface of the rear cross member. As a result, with a simple configuration, the bracket can firmly mount the rear end of the bar to the bottom surface of the rear cross member while enclosing the rear end from the bottom of the vehicle body.

In a preferred form, the bracket includes side plates opposed to side surfaces of the rear end of the bar, the side plates having openings facing the side surfaces and being superposed on the bar so as to allow edges defining the openings to be joined by MIG welding to the side surfaces. As a result, the edges of the openings formed in the side plates of the bracket can be joined to the side surfaces of the rear end of the bar by MIG welding. Therefore, the bracket can firmly enclose and integrate the rear end of the bar.

Preferably, the bar has a front end which is offset from the rear end of the bar in a vertical direction of the vehicle body. Therefore, the bar can be made to pass along the bottom surface of the fuel tank.

In a preferred form, the bar extends in a longitudinal direction of the vehicle body. In the described embodiment, the bar extends along the length of the vehicle body from the vehicle-widthwise center part of the rear cross member to the vehicle-widthwise center part of the front cross member. As a result, the collision load acted on the rear cross member from the colliding object can be efficiently transferred to the vehicle.

Desirably, the vehicle body rear part structure further comprises a tank support bar positioned alongside the bar, wherein the fuel tank is mounted to the vehicle body by the bar and the tank support bar. As a result, the fuel tank can be firmly mounted to the vehicle body.

In a preferred form, the bar protects the fuel tank by covering at least part of a bottom surface of the fuel tank. As a result, the bar also serves as a protecting member for protecting the fuel tank.

In a further preferred form, the bar has a front end which is superposed on a bottom surface of the front cross member and mounted by a coupling member vertically passing through the front end. As a result, the front end of the bar is superposed on the bottom surface of the front cross member and is firmly mounted to the front cross member by a coupling member formed vertically through the front end. The front cross member is a reinforcing member of the vehicle body, which spans between the front ends of the left and right rear side frames. Therefore, the bar is capable of creating a large amount of resistance during a rear-side collision.

It is preferred that the bottom surface of the rear cross member and the flanges have bolt insertion holes that allow insertion of bolts vertically therethrough. The bolt insertion holes of the flanges may be configured to have one of an oblong shape and a diameter larger than the bolt insertion holes of the rear cross member. The flanges may be mounted to the bottom surface of the rear cross member by the bolts passed through the bolt insertion holes. In this arrangement, when the flanges are bolted to the bottom surface of the rear cross member, it is easy to align the positions of the bolt insertion holes.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Embodiment 1

Figure 1:
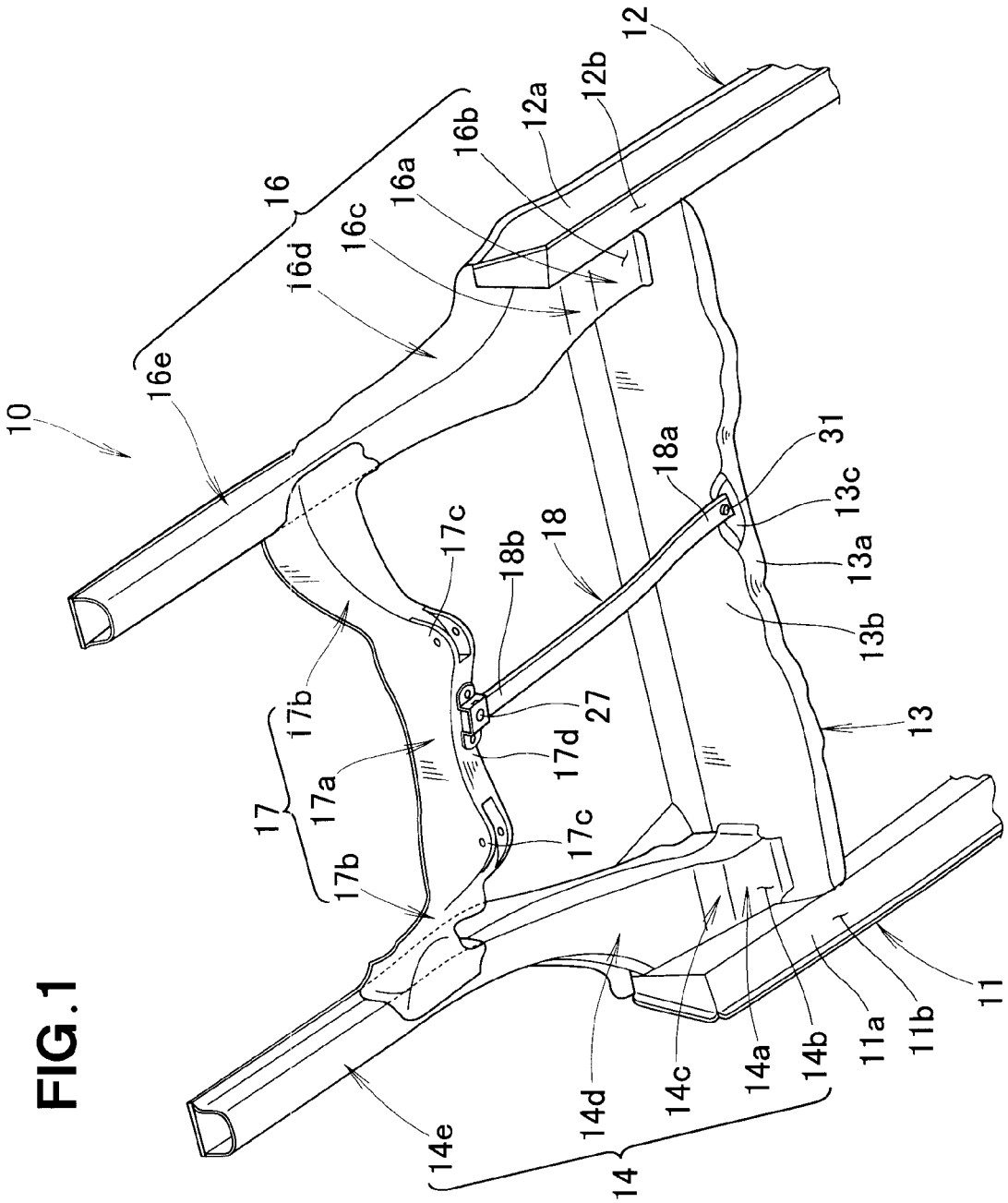
FIG. 1 is a perspective view of a rear part of a vehicle body according to a first embodiment of the present invention, as seen from below.
Figure 2:
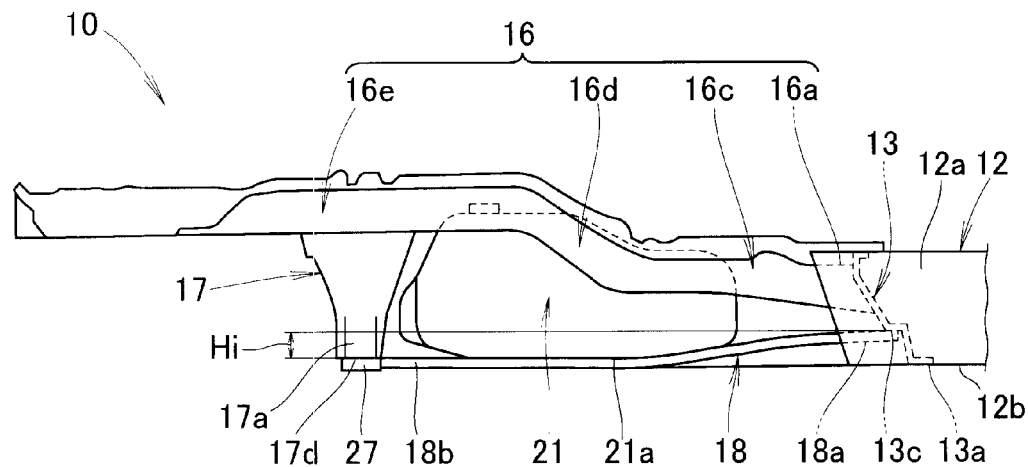
FIG. 2 is a side view of the vehicle body rear part of FIG. 1.
Figure 3:
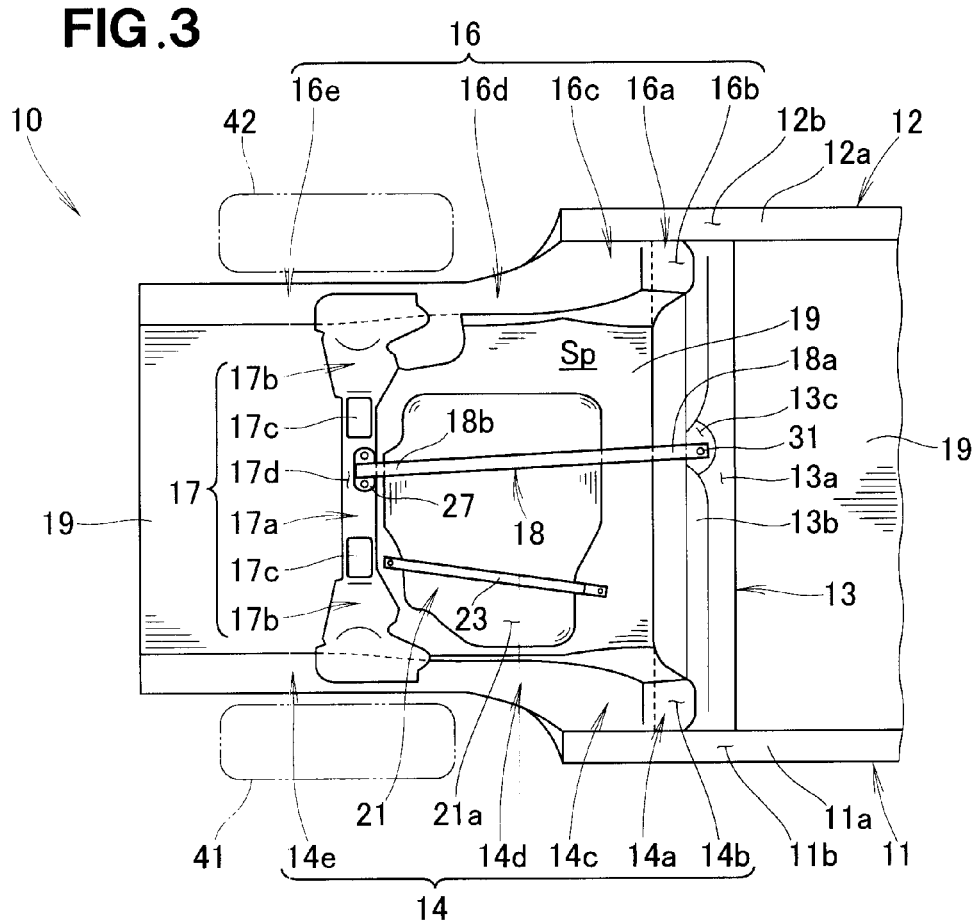
FIG. 3 is a bottom view of the vehicle body rear part of FIG. 1.

A vehicle body 10 shown in FIGS. 1 through 3 is used in a passenger vehicle or another type of vehicle. The rear lower part of the vehicle body 10 includes left and right rear side frames 14, 16, and front and rear cross members 13, 17 joined to the left and right rear side frames 14, 16.

The left and right rear side frames 14, 16 (hereinbelow referred to simply as rear side frames 14, 16) are positioned separate from each other in a vehicle width direction in a rear part of the vehicle body 10, and are long, thin members extending in a vehicle body longitudinal direction. A front end 14a of the left rear frame 14 is joined to a rear end 11a of a left side sill 11. A front end 16a of the right rear frame 16 is joined to a rear end 12a of a right side sill 12. Bottom surfaces 14b, 16b of the front ends 14a, 16a of the left and right rear side frames 14, 16 are positioned higher than bottom surfaces 11b, 12b of the rear ends 11a, 12a of the left and right side sills 11, 12.

The left and right rear side frames 14, 16 comprise substantially horizontal frame front parts 14c, 16c extending rearward from the front ends 14a, 16a, inclined parts 14d, 16d extending rearward and upward from the rear ends of the frame front parts 14c, 16c and substantially horizontal frame rear parts 14e, 16e extending rearward from the rear ends of the inclined parts 14d, 16d.

The front cross member 13 spans between the front ends 14a, 16a of the left and right rear side frames 14, 16. Specifically, the front cross member 13 is a member substantially horizontal in the vehicle width direction, and is made to span between the portions where the front ends 14a, 16a of the left and right rear side frames 14, 16 join with the rear ends 11a, 12a of the left and right side sills 11, 12. The bottom surface 13a of the front cross member 13 is positioned at substantially the same height as the bottom surfaces 11b, 12b of the rear ends 11a, 12a of the left and right side sills 11, 12.

The rear cross member 17 is positioned behind the front cross member 13 and is made to span between the left and right rear side frames 14, 16. For example, the rear cross member 17 spans between the longitudinal centers of the left and right rear side frames 14, 16, i.e., between the left and right frame rear parts 14e, 16e.

Figure 4:
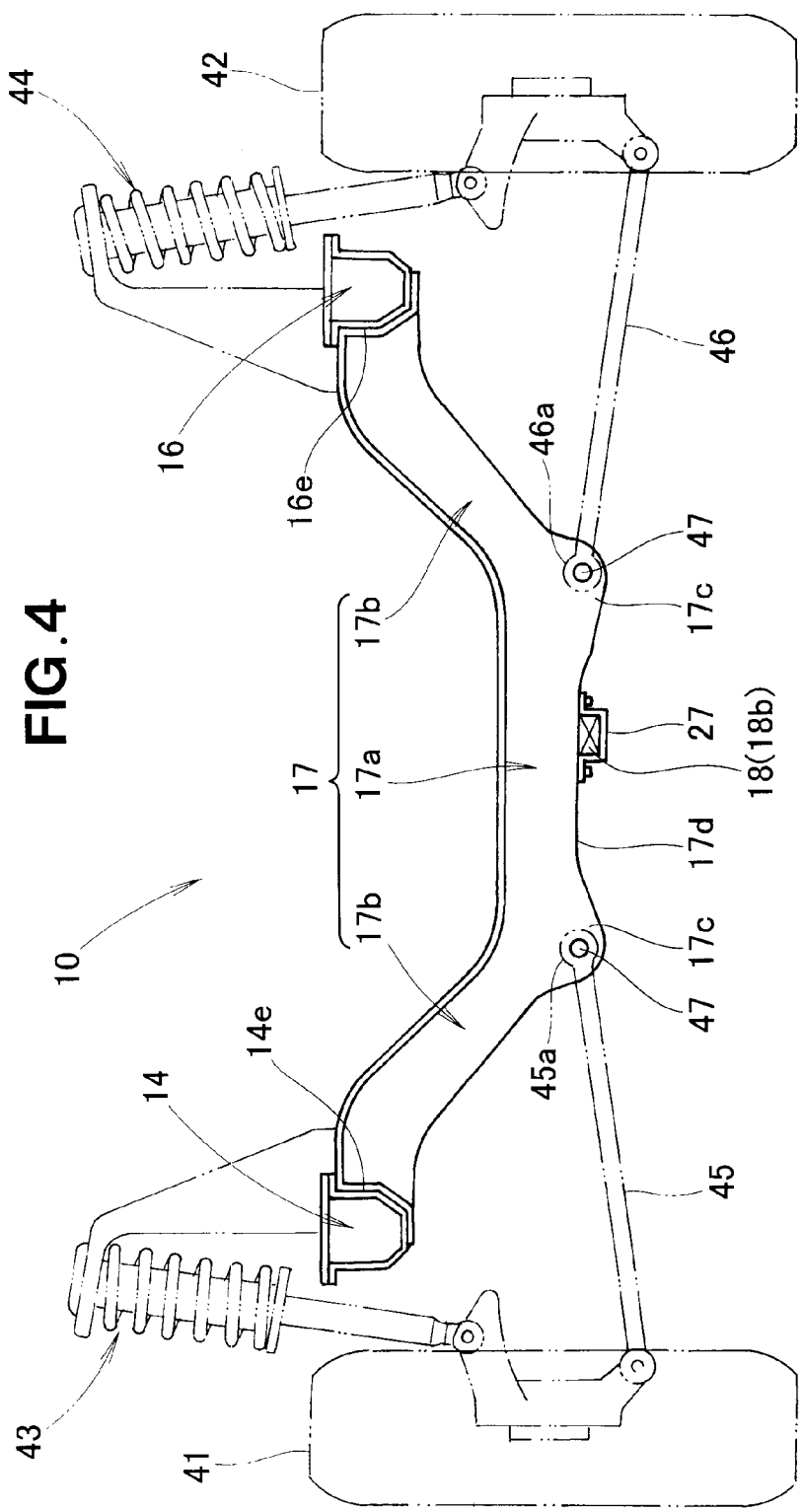
FIG. 4 is a rear view of the vehicle body of FIG. 1.

The rear cross member 17 is formed into a substantial U shape in which a vehicle-widthwise center part 17a is lower than the ends 17b, 17b as shown in FIGS. 1, 2, and 4. The ends 17b, 17b of the rear cross member 17 are joined to the side surfaces of the left and right frame rear parts 14e, 16e, and the ends are inclined so as to lower as they approach the center part 17a. The center part 17a is formed into a substantially horizontal shape, having arm support parts 17c, 17c at the vehicle-widthwise ends. A bottom surface 17d of the center part 17a is positioned at substantially the same height as the bottom surface 13a of the front cross member 13.

The left and right arm support parts 17c, 17c are components for supporting left and right rear suspensions 43, 44 for suspending left and right rear wheels 41, 42, as shown in FIG. 4. The left and right rear suspensions 43, 44 have double-wishbone or multi-link configurations, for example, and have lower arms 45, 46, respectively. Distal ends 45a, 46a of the left and right lower arms 45, 46 are connected to the left and right arm support parts 17c, 17c by pins 47, 47. As a result, the left and right lower arms 45, 46 are supported on the left and right arm support parts 17c, 17c.

The bottom surface 13a of the vehicle-widthwise center part 13b of the front cross member 13 and the bottom surface 17d of the vehicle-widthwise center part 17a of the rear cross member 17 are connected to each other by a connecting bar 18, as shown in FIGS. 1 through 3.

A floor panel 19 is spread over the top surface of the vehicle body 10, as shown in FIG. 3. A fuel tank 21 is placed below the floor panel 19, in a space Sp enclosed by the left and right rear side frames 14, 16, the front cross member 13, and the rear cross member 17.

The fuel tank 21 is mounted using the connecting bar 18 and a tank support bar 23 so as to be capable of being taken out from underneath the vehicle body 10, as shown in FIGS. 2 and 3. The tank support bar 23 is positioned separate from the connecting bar 18 in the vehicle width direction (to the side), is made to extend in the longitudinal direction of the vehicle body 10, and is mounted in a removable manner by being bolted or otherwise secured at both ends to the floor panel 19, for example. Since the fuel tank 21 is mounted to the vehicle body 10 by two bars, namely, the connecting bar 18 and the tank support bar 23, the fuel tank 21 is firmly mounted to the vehicle body 10.

The connecting bar 18 and the tank support bar 23 are positioned so as to pass underneath the fuel tank 21, thereby covering at least part of a bottom surface 21a of the fuel tank 21. In other words, the connecting bar 18 and the tank support bar 23 are members (tank protection bars) capable of mounting the fuel tank 21 to the vehicle body 10 and protecting the fuel tank 21.

As is made clear from the above description, the connecting bar 18 for reinforcing the rear part of the vehicle body 10 also fulfills the role of a protecting member for protecting the fuel tank 21. In other words, the connecting bar 18 is disposed underneath the fuel tank 21 positioned in the bottom part of the vehicle body 10, whereby the fuel tank 21 can be protected by the connecting bar 18. Since the connecting bar 18 for reinforcing the rear part of the vehicle body 10 can also serve as a member for protecting the fuel tank 21, the number of components can be reduced, and the cost of the vehicle body 10 can be reduced.

The structure for mounting the connecting bar 18 (hereinbelow referred to simply as the bar 18) is described in detail hereinbelow.

The bottom surface 13a of the center part 13b of the front cross member 13 has a flat mounting surface 13c for mounting a front end 18a of the bar 18, as shown in FIG. 2. The mounting surface 13c is a horizontal surface set in a position which is higher by a height Hi than the bottom surface 17d of the center part 17a of the rear cross member 17.

A rear end 18b of the connecting bar 18 is attached to the bottom surface 17d of the center part 17a of the rear cross member 17. With the bar 18 in a state of being mounted between the front cross member 13 and the rear cross member 17, the front end 18a is positioned higher than the rear end 18b. In other words, the front end 18a is offset from the rear end 18b in the vertical direction of the vehicle body 10. Therefore, the bar 18 can be easily disposed along the bottom surface 21a of the fuel tank 21.

Figure 5:
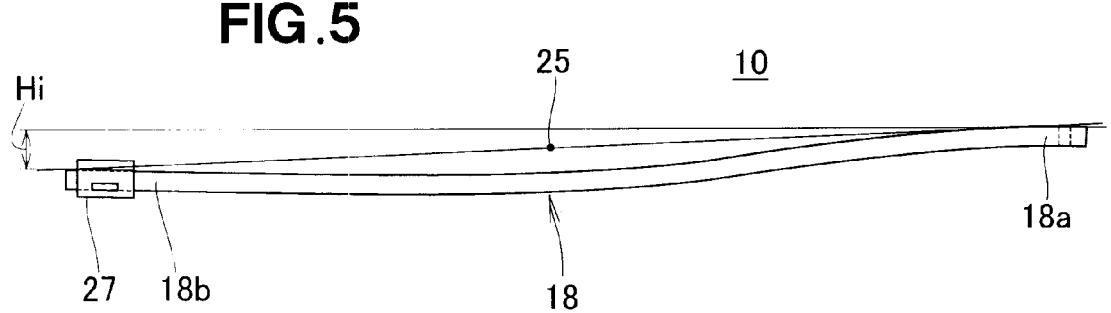
FIG. 5 is an enlarged view of a bar shown in FIG. 2.

FIG. 5 shows an enlarged view of the bar 18 shown in FIG. 2. The bar 18 is curved, i.e., formed into a bow shape so as to be convex toward the bottom of the vehicle body 10. A straight line 25 between the top surface of the front end 18a of the bar 18 and the top surface of the rear end 18b is herein referred to as a tangent 25.

The bar 18 is a square bar having a rectangular shape in cross section, the wider surface being mounted to the vehicle body 10 as shown in FIGS. 6(a) and 6(b). The front end 18a of the bar 18 has a single bolt insertion hole 18c passing vertically through the bar. The bolt insertion hole 18c is a perfectly circular round hole. To mount the front end 18a to the front cross member 13, the front end 18a is first superposed on the mounting surface 13c of the front cross member 13, a bolt 31 is passed through the bolt insertion hole 18c from below, and the bolt is threaded into a nut 32 in the front cross member 13. Thus, the front end 18a of the bar 18 is superposed on the bottom surface 13a of the front cross member 13, and the front end 18a is mounted by a bolt (coupling member) 31 passing vertically through the bar.

Thus, the front end 18a of the bar 18 is superposed on the bottom surface 13a of the front cross member 13, i.e. on the mounting surface 13c, and is firmly mounted to the front cross member 13 by the vertically oriented coupling member 31. The front cross member 13 is a high-strength member of the vehicle body 10, spanning between the front ends 14a, 16a of the left and right rear side frames 14, 16 as shown in FIG. 3.

Therefore, the bar 18 is capable of generating a large amount of resistance during a rear-side collision.

The rear end 18b of the bar 18 is mounted by a bracket 27 to the rear cross member 17. The bracket 27 is a member for enclosing the rear end 18b of the bar 18 on the vehicle body 10 from below and mounting the rear end 18b to the bottom surface 17d of the rear cross member 17, and is formed into a hat-shaped cross section which is open in the top.

More specifically, the bracket 27 comprises a horizontal bottom plate 27a, left and right side plates 27b, 27c facing each other and extending upward from the left and right ends of the bottom plate 27a, and left and right flanges 27d, 27e extending horizontally in opposite directions from the top ends of the left and right side plates 27b, 27c. Thus, the bracket 27 is formed into a substantial U shape by the bottom plate 27a and the left and right side plates 27b, 27c, and the bracket 27 has left and right flanges 27d, 27e at the top ends.

The bottom plate 27a is superposed so as to be capable of opposing a bottom surface 18e of the rear end 18b of the bar 18. The left and right side plates 27b, 27c are capable of opposing side surfaces 18d, 18d of the rear end 18b of the bar 18. The side plates 27b, 27c have rectangular openings 27f, 27f facing the side surfaces 18d, 18d, and the side plates are superposed so that edges 27g, 27g forming the openings 27f, 27f can be joined by MIG (metal inert gas) welding to the side surfaces 18d, 18d of the rear end 18b of the bar 18.

The left and right flanges 27d, 27e are members that are superposed on and mounted to the bottom surface 17d of the rear cross member 17, and these flanges have bolt insertion holes 27h, 27h formed vertically through the flanges. The bottom surface 17d of the rear cross member 17 has two bolt insertion holes 17e, 17e formed vertically through the surface at positions corresponding to the bolt insertion holes 27h, 27h of the left and right flanges 27d, 27e. The bolt insertion holes 17e, 17e are perfectly circular round holes. The bolt insertion holes 27h, 27h of the flanges 27d, 27e are designed with oblong shapes parallel to the longitudinal direction of the bar 18.

Bolts (coupling members) 33, 33 can be passed vertically through the bolt insertion holes 17e, 17e of the rear cross member 17 and the bolt insertion holes 27h, 27h of the left and right flanges 27d, 27e. The flanges 27d, 27e are mounted to the rear cross member 17 by the bolts 33, 33 passed through the respective bolt insertion holes 27h, 27h. Since the bolt insertion holes 27h, 27h of the flanges 27d, 27e are configured as oblong holes, it is easy to align the positions of the bolt insertion holes 17e, 17e, 27h, 27h when the flanges 27d, 27e are bolted to the bottom surface 17d of the rear cross member 17.

The method for mounting the rear end 18b of the bar 18 to the rear cross member 17 may be either of the following two methods, for example.

One mounting method is as follows. First, the bracket 27 is fitted over the rear end 18b of the bar 18. Next, the rear end 18b of the bar 18 and the left and right flanges 27d, 27e are superposed on the bottom surface 17d of the rear cross member 17, and the positions of the bolt insertion holes 17e, 17e, 27h, 27h are aligned. The bolts 33, 33 are then inserted from below through the bolt insertion holes 27h, 27h of the left and right flanges 27d, 27e and the bolt insertion holes 17e, 17e of the rear cross member 17, and the bolts are threaded into the nuts 34, 34 of the rear cross member 17. Finally, the edges 27g, 27g of the openings 27f, 27f are joined by MIG welding to the side surfaces 18d, 18d of the rear end 18b of the bar 18, and the mounting operation is complete.

The second attachment method is as follows. First, the bracket 27 is fitted over the rear end 18b of the bar 18, and the positions of the rear end 18b and the bracket 27 are aligned. Next, the edges 27g, 27g of the openings 27f, 27f are joined by MIG welding to the side surfaces 18d, 18d of the rear end 18b of the bar 18. The rear end 18b of the bar 18 and the left and right flanges 27d, 27e are then superposed on the bottom surface 17d of the rear cross member 17, and the positions of the bolt insertion holes 17e, 17e, 27h, 27h are aligned together. Lastly, the bolts 33, 33 are inserted from below through the bolt insertion holes 27h, 27h of the left and right flanges 27d, 27e and the bolt insertion holes 17e, 17e of the rear cross member 17, the bolts are threaded into the nuts, 34, 34 of the rear cross member 17, and the mounting operation is complete.

Thus, the edges 27g, 27g of the openings 27f, 27f formed in the left and right side plates 27b, 27c of the bracket 27 can be joined by MIG welding to the side surfaces 18d, 18d of the rear end 18b of the bar 18. Therefore, the bracket 27 can firmly contain and integrate the rear end 18b of the bar 18. Moreover, the side surfaces 18d, 18d of the rear end 18b of the bar 18 and the left and right side plates 27b, 27c of the bracket 27 can be easily and efficiently joined through the openings 27f, 27f.

As described above, the bracket 27 is designed so as to enclose the rear end 18b of the bar 18 from below, and the bracket mounts the rear end to the rear cross member 17. Therefore, the rear end 18b of the bar 18 can be firmly mounted to the rear cross member 17, and bending deformation of the bar 18 can be reduced.

Furthermore, the bracket 27 is formed into a substantial U shape, as well as being formed into a so-called substantial hat-shaped cross section having flanges 27d, 27e at the upper ends. With a bracket 27 having this simple structure, the rear end 18b of the bar 18 can be enclosed from below the vehicle body 10 and firmly mounted to the bottom surface 17d of the rear cross member 17.

Instead of oblong holes, the bolt insertion holes 27h, 27h of the flanges 27d, 27e may also be formed into round holes larger in diameter than the bolt insertion holes 17e, 17e of the rear cross member 17 as shown in FIG. 6(d).

The following is a description of the action of the above-described vehicle body rear part structure.

Figure 7:
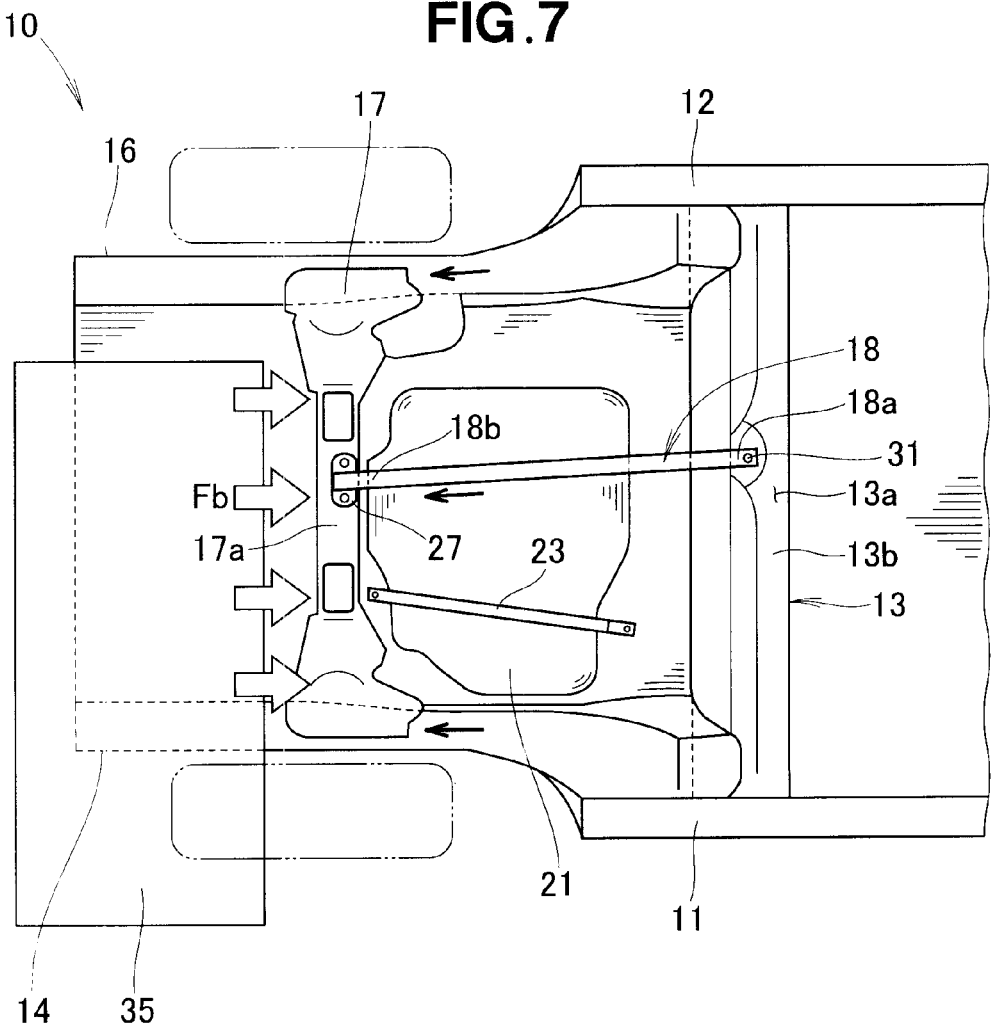
FIG. 7 is a schematic view illustrating how a collision load resulted from a rear-side collision acts on the vehicle body rear part of FIG. 3.

In the case of a so-called rear-side collision, in which a trailing vehicle or another object 35 collides with the rear part of the vehicle body 10 from behind as shown in FIG. 7, a collision load Fb (collision energy) acts on the rear cross member 17 from the colliding object 35 as indicated by the white arrows. As a result, the rear cross member 17 acts as though to elastically deform toward the front of the vehicle body.

A "common vehicle body" having no member equivalent to the bar 18 has a "dual fixed end" beam structure in which merely both ends of the rear cross member 17 are joined to the left and right rear side frames 14, 16. Therefore, a large bending moment is applied to the rear cross member 17. To reduce the deformation of the rear cross member 17 caused by the collision load Fb, for example, the strength and rigidity of the rear cross member 17 and the left and right rear side frames 14, 16 joined to the rear cross member 17 must be increased.

To comply with this requirement, in the present embodiment, the vehicle-widthwise center part 13b of the front cross member 13 and the vehicle-widthwise center part 17a of the rear cross member 17 are connected by the bar 18. Therefore, the collision load Fb acting on the rear cross member 17 from the colliding object 35 is transferred from the rear cross member 17 to the front cross member 13 via the bar 18. Thus, the collision load Fb can be borne by a composite assembly comprising the combination of the front cross member 13, the rear cross member 17, and the bar 18.

Furthermore, during a rear-side collision, the deformation of the rear cross member 17 can be reduced as much as possible by the resistance (opposing force against the collision load) generated in the longitudinal direction of the bar 18. Therefore, the deformation of the rear cross member 17 can be reduced as much as possible. Thus, the bar 18 fulfills the role of a stay. The vehicle-widthwise center part 17a of the rear cross member 17 is also supported by the bar 18, whereby the strain on the rear cross member 17 and the left and right rear side frames 14, 16 can be reduced. As a result, the strength and rigidity of the rear cross member 17 and the left and right rear side frames 14, 16 can be reduced, and the weight of the vehicle body 10 can therefore be reduced. Moreover, the rear part of the vehicle body 10 can be reinforced by a extremely simple configuration having a small number of components, wherein merely the vehicle-widthwise center part 13b of the front cross member 13 and the vehicle-widthwise center part 17a of the rear cross member 17 are connected by the bar 18.

Figure 8:
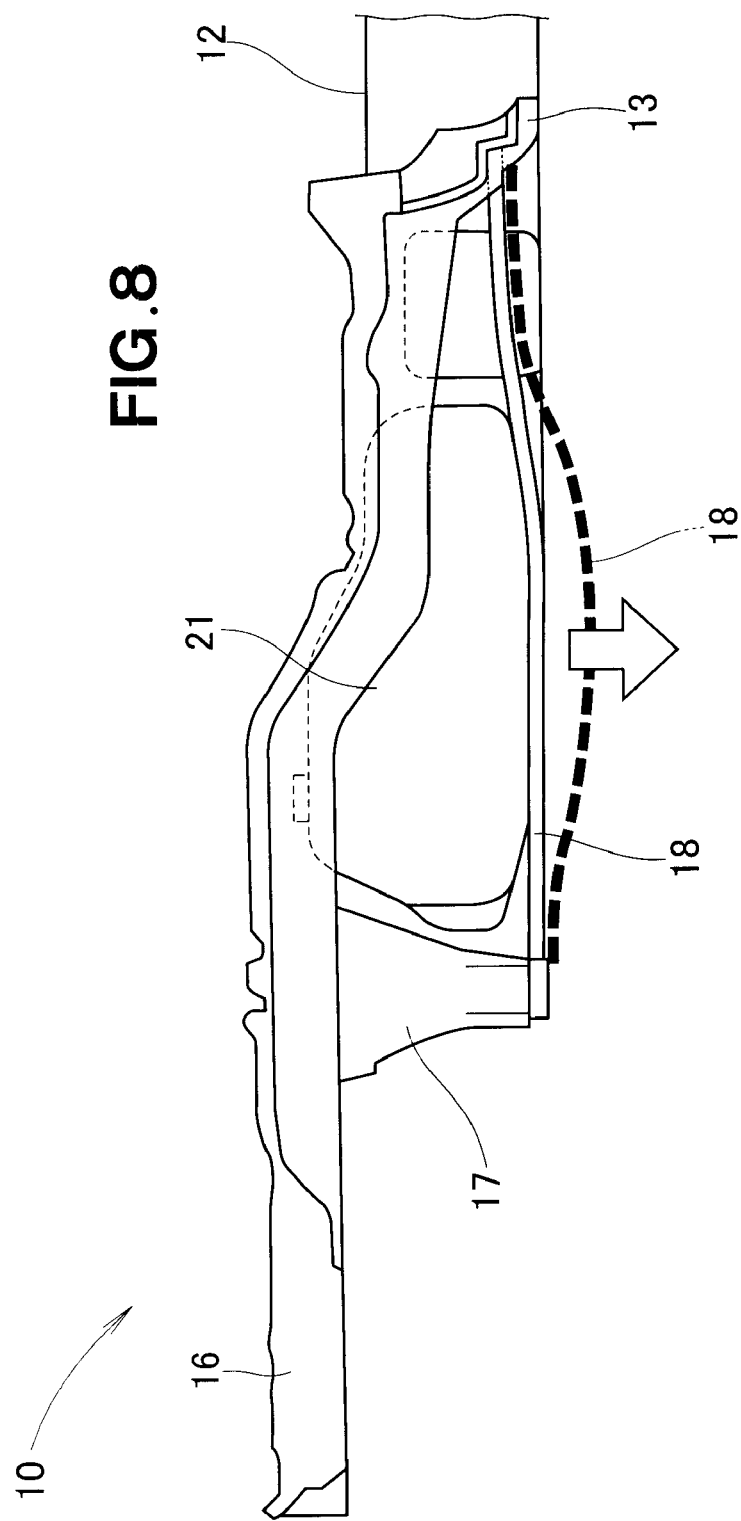
FIG. 8 is a schematic view showing how the bar bends when a rear-side collision occurred in the vehicle body rear part of FIG. 2.

Furthermore, the bar 18 curves in a convex manner toward the bottom of the vehicle body as shown in FIG. 8. Therefore, the bar 18 is bent downward as shown by the bold dashed line in the drawing by the collision load Fb in the longitudinal direction of the bar 18, the load having been transferred from the rear cross member 17 to the front end 18a. Therefore, there is no concern over the deformed bar 18 coming in contact with and pressing up against the fuel tank 21.

Figure 6:
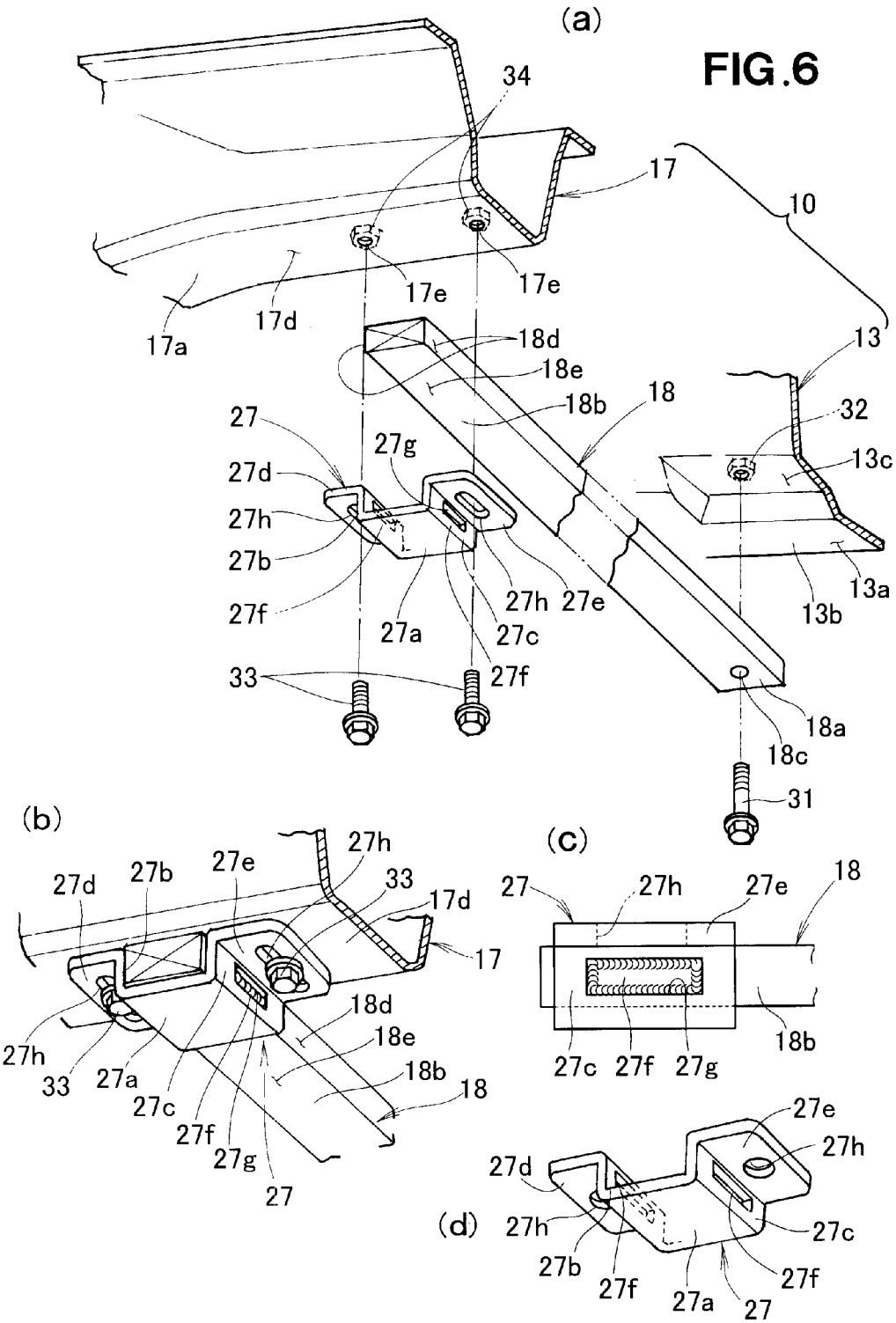
FIG. 6 is a view illustrating a structure for mounting opposite ends of the bar of FIG. 1.
Figure 9:
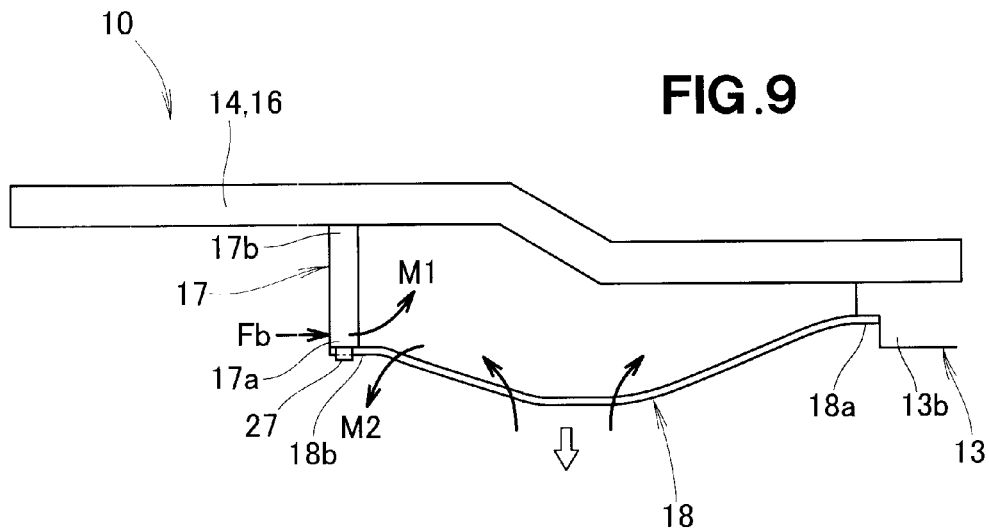
FIG. 9 is a schematic view showing a relationship between a rear cross member and the bar as a rear-side collision occurred in the vehicle body rear part of FIG. 8.

Furthermore, the rear end 18b of the bar 18 is enclosed from the bottom of the vehicle body 10 by the bracket 27 and mounted to the bottom surface 17d of the rear cross member 17, as shown in FIG. 6. Therefore, the rear end 18b of the bar 18 can be firmly mounted to the rear cross member 17 by the bracket 27. Moreover, the bottom surface 18e of the rear end 18b of the bar 18 is pushed from below by the bracket 27 which encloses the bar from the bottom of the vehicle body 10. Therefore, it is possible to reduce the deformation of the bar 18 toward the bottom of the vehicle body 10 as caused by the collision load Fb, as shown in FIG. 9. Therefore, a large amount of resistance (opposing force) is created in the bar 18 against the collision load Fb acting to bendably deform the bar 18 downward.

Furthermore, the vehicle-widthwise center part 17a is designed to be lower than the vehicle-widthwise ends 17b, 17b in order for the rear cross member 17 to support the lower arms 45, 46 of the left and right rear suspensions 43, 44, as shown in FIG. 4. Therefore, when a collision load Fb acts on the vehicle-widthwise center part 17a of the rear cross member 17 as shown in FIG. 9, a bending moment M1 acting in a direction of collapsing backward is applied to the rear cross member 17 such that the reference points are the proximal ends of the vehicle-widthwise ends 17b, 17b joined to the left and right rear side frames 14, 16.

To deal with this occurrence, the rear end 18b of the bar 18, which bends in a convex manner towards the bottom of the vehicle body 10, is mounted to the vehicle-widthwise center part 17a of the rear cross member 17 by the bracket 27 for enclosing the rear end from the bottom of the vehicle body 10. The collision load Fb transferred to the rear end 18b of the bar 18 from the rear cross member 17 acts to bendably deform the bar 18 toward the bottom of the vehicle body 10. At this time, resistance is created in the bar 18 against the collision load Fb acting as though to deform the bar downward. As a result, a so-called opposite moment M2 is applied to the bar 18, the moment M2 being a moment acting in a direction of cancelling out the bending moment M1. Therefore, the collapse of the rear cross member 17 can be reduced.

Furthermore, the bar 18 extends in the longitudinal direction of the vehicle body 10 from the vehicle-widthwise center part 17a of the rear cross member 17 to the vehicle-widthwise center part 13b of the front cross member 13. Therefore, the collision load Fb acting on the rear cross member 17 can be efficiently transferred to the vehicle-widthwise center part 13b of the front cross member 13 via the bar 18.

Embodiment 2

Figure 10:
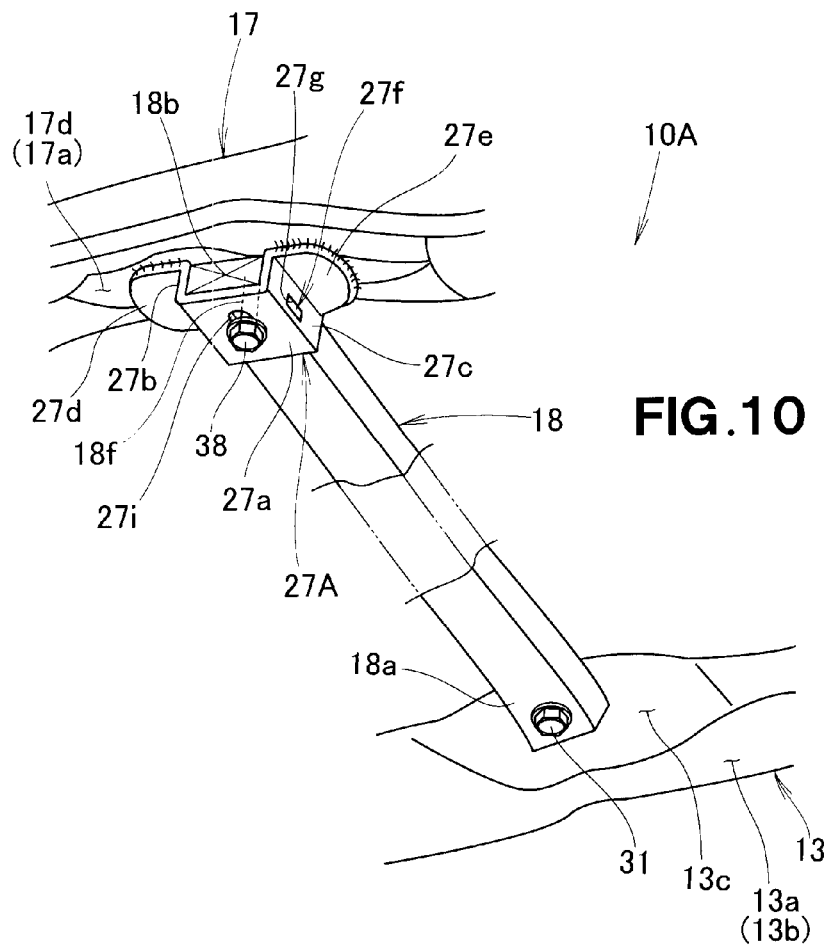
FIG. 10 is a schematic view showing a structure for mounting opposite ends of a bar of a vehicle body according to a second embodiment of the present invention.
Figure 11:
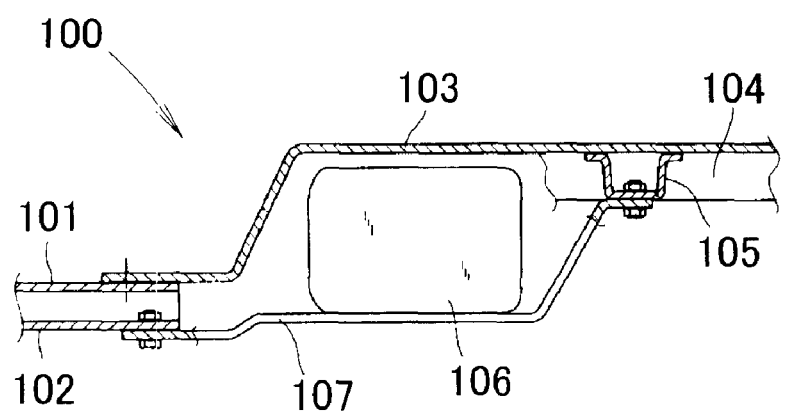
FIG. 11 is a cross-sectional view showing a rear part of a vehicle body according to a first conventional arrangement, as seen from sideways.
Figure 12:
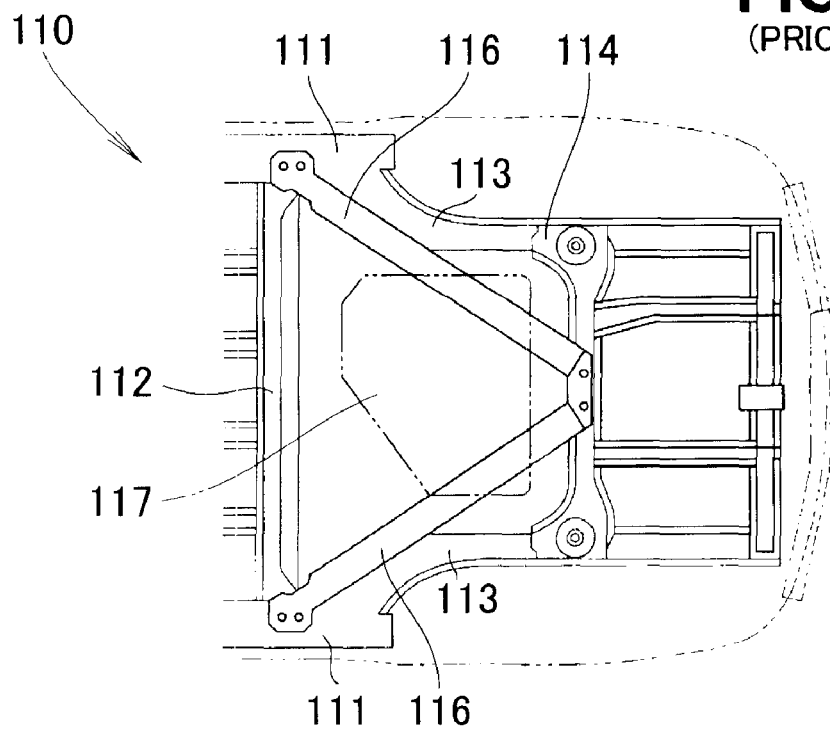
FIG. 12 is a bottom view showing a rear part of a vehicle body according to a second conventional arrangement.

FIG. 10 shows a structure for mounting both ends of the bar 18 of a vehicle body 10A according to the second embodiment. The vehicle body 10A of the second embodiment is characterized in that the bracket 27 of the first embodiment shown in FIGS. 6(a) to 6(c) has been modified to a bracket 27A shown in FIG. 10, and the configuration and actions are otherwise the same as the configuration and actions of the vehicle body 10 shown in FIGS. 1 through 9 and are therefore not described.

Specifically, the left and right flanges 27d, 27e of the bracket 27A according to the second embodiment are characterized in being welded rather than bolted to the rear cross member 17. Therefore, the left and right flanges 27d, 27e do not have bolt insertion holes. The bottom plate 27a has a single bolt insertion hole 27i formed vertically through the plate. The bolt insertion hole 27i is designed having an oblong shape parallel to the longitudinal direction of the bar 18. The bottom surface 18e of the rear end 18b of the bar 18 has a single screw hole 18f corresponding to the bolt insertion hole 27i.

The method for mounting the rear end 18b of the bar 18 to the rear cross member 17 is, for example, as follows.

First, the rear end 18b of the bar 18 is fitted into the bracket 27A. Next, a bolt is inserted through the bolt insertion hole 27i and is loosely threaded (secured) into the screw hole 18f. The left and right flanges 27d, 27e are then superposed and welded to the bottom surface 17d of the rear cross member 17. The bolt 38 is then tightly threaded into the screw hole 18f. Finally, the edges 27g, 27g of the openings 27f, 27f are joined by MIG welding to the side surfaces 18d, 18d of the rear end 18b of the bar 18, and the mounting operation is complete.

In the present invention, the bar 18 is not limited to a square bar having a rectangular cross section; it may also be a square pipe having a rectangular cross section or a U-shaped pipe, for example.

Obviously, various minor changes and modifications of the present invention are possible in light of the above teaching. It is therefore to be understood that within the scope of the appended claims the invention may be practiced otherwise than as specifically described.

What is claimed is:

1. A vehicle body rear part structure comprising: left and right rear side frames disposed at a rear part of a vehicle body such that they are spaced apart from each other laterally of a vehicle body and extend longitudinally of the vehicle body; a front cross member extending between front ends of the left and right rear side frames; and a rear cross member positioned behind the front cross member and extending between the left and right rear side frames, the rear cross member having vehicle-body-widthwise ends and a center part positioned between and lower than the widthwise-direction ends, the widthwise center part of the rear cross member having arm support parts for supporting lower arms of left and right rear suspensions, wherein the vehicle body rear part structure further comprises: a bar; and a bracket, the bar is provided for connecting a widthwise center part of the front cross member and the widthwise center part of the rear cross member and is curved in a convex manner toward a bottom of the vehicle body, and the bracket is provided for mounting a rear end of the bar, positioned on a bottom surface of the widthwise center part of the rear cross member, onto the bottom surface of the widthwise center part while enclosing the bar rear end from the bottom of the vehicle body.

2. The vehicle body rear part structure of claim 1, wherein the bar passes below a fuel tank disposed between the front cross member and the rear cross member.

3. The vehicle body rear part structure of claim 1, wherein the bracket is formed into a generally U shape having flanges at upper ends thereof, the flanges being superposed and mounted onto the bottom surface of the rear cross member.

4. The vehicle body rear part structure of claim 1, wherein the bracket includes side plates opposed to side surfaces of the rear end of the bar, the side plates having openings facing the side surfaces and being superposed on the bar so as to allow edges defining the openings to be joined by MIG welding to the side surfaces.

5. The vehicle body rear part structure of claim 1, wherein the bar has a front end which is offset from the rear end of the bar in a vertical direction of the vehicle body.

6. The vehicle body rear part structure of claim 1, wherein the bar extends longitudinally of the vehicle body.

7. The vehicle body rear part structure of claim 2, further comprising a tank support bar positioned alongside the bar, wherein the fuel tank is mounted to the vehicle body by the bar and the tank support bar.

8. The vehicle body rear part structure of claim 7, wherein the bar protects the fuel tank by covering at least part of a bottom surface of the fuel tank.

9. The vehicle body rear part structure of claim 1, wherein the bar has a front end which is superposed on a bottom surface of the front cross member and mounted by a coupling member vertically passing through the front end.

10. The vehicle body rear part structure of claim 3, wherein the bottom surface of the rear cross member and the flanges have bolt insertion holes that allow insertion of bolts vertically therethrough, the bolt insertion holes of the flanges being configured to have one of an oblong shape and a diameter larger than the bolt insertion holes of the rear cross member, the flanges being mounted to the bottom surface of the rear cross member by the bolts passed through the bolt insertion holes.

* * * * *